(12) United States Patent
Kawashima

(10) Patent No.: US 6,184,640 B1
(45) Date of Patent: Feb. 6, 2001

(54) DC BRUSHLESS MOTOR, MAGNETIC BEARING DEVICE AND TURBOMOLECULAR PUMP DEVICE

(75) Inventor: Toshiaki Kawashima, Narashino (JP)

(73) Assignee: Seiko Seiki Kabushiki Kaisha ( * ) Notice: Under 35 U.S.C. 154(b), the term of this patent shall be extended for 0 days.

(21) Appl. No.: 09/299,466

(22) Filed: Apr. 26, 1999

(30) Foreign Application Priority Data

Apr. 28, 1998 (JP) .................................................. 10-134405

(51) Int. Cl.[7] ...................................................... H02P 1/04
(52) U.S. Cl. ......................... 318/461; 318/254; 318/138; 318/439; 318/491; 310/48; 310/42
(58) Field of Search ................................... 318/461, 234, 318/138, 439, 491; 310/48, 42

(56) References Cited

U.S. PATENT DOCUMENTS

| | | | |
|---|---|---|---|
| 4,554,491 | * 11/1985 | Plunkett | 318/254 |
| 5,041,749 | * 8/1991 | Gaser et al. | 310/48 |
| 5,440,185 | * 8/1995 | Allwine, Jr. | 310/46 |
| 5,691,683 | * 11/1997 | Allwine, Jr. | 310/49 |
| 5,770,933 | * 6/1998 | Larson et al. | 318/254 |

* cited by examiner

Primary Examiner—Karen Masih
(74) Attorney, Agent, or Firm—Adams & Wilks

(57) ABSTRACT

A turbomolecular pump device having a DC brushless motor provided with a simplified rpm detection mechanism is provided. A pickup coil for detecting a magnetic flux produced by a permanent magnet of the DC brushless motor is built in the motor. Namely, a small size, low cost, simple and strong pickup coil is disposed in a space between the permanent magnet (rotor) of the DC brushless motor and the motor drive coil (stator coil). The magnetic flux produced by the permanent magnet in the pickup coil is detected. This is converted into an rpm signal of the DC brushless motor by a sequence controlling circuit. It is supervised whether or not the overspeed is performed. Then, when the overspeed is detected, an interruption command is fed to the power source breaker so that the supply of the power is forcibly interrupted to thereby stop the DC brushless motor.

14 Claims, 6 Drawing Sheets

DC BRUSHLESS MOTOR, MAGNETIC BEARING DEVICE AND TURBOMOLECULAR PUMP DEVICE

BACKGROUND OF THE INVENTION

1. Field of the Invention

The present invention relates to a DC brushless motor, a magnetic bearing device and a turbomolecular pump device, in which an rpm can be detected by a simple structure.

2. Description of the Related Art

In many cases in a turbomolecular pump device which is used as a vacuum device such as a semiconductor production line, particularly in a magnetic bearing type turbomolecular pump device that is to be rotated at a high speed of 10,000 rpm or more, DC brushless motors are used for driving rotors. This is because the DC brushless motor is of a compact and high power type and of an energy saving type in comparison with an induction motor, and it is possible to touch down the DC brushless motor after the motor rotates at a low rpm by using the motor as a power generator during the power failure or the like.

However, although the DC brushless motor is provided with a drive circuit for detecting a commutation timing and controlling the rpm, if the drive circuit is broken down so that the motor rotates in an overspeed condition with the rpm exceeding a rated value (for example, 48,000 rpm), there is a fear that the rotor would not be durable against a centrifugal force, resulting in fracture.

In order to prevent such an overspeed, in general, there is provided a protection function for stopping the motor during the overspeed by detecting an output frequency of the motor, i.e., a frequency of the rotational magnetic field.

Also, as a double safety countermeasure in case of the failure of such a protection function, there is provided an rpm detection mechanism for stopping the motor during the overspeed by detecting the rpm of the motor with another independent system.

FIG. 6 shows an overview of such a conventional turbomolecular pump device and a mounting position of a rpm detection mechanism. FIG. 7 schematically shows a structure (a) of the rpm detection mechanism and a detection signal (b).

AS shown in FIG. 6, the conventional rpm detection mechanism in the turbomolecular pump device is provided with an rpm detecting coil 201 and a retainer ring 202. The retainer ring 202 is mounted on a lower end portion of a rotor shaft R. The rpm detecting coil 201 is arranged and fixed on the lower side at a predetermined interval to the retainer ring 202.

As shown in FIG. 7(a), a small size magnetic member is mounted as a target 203 on a lower surface of the retainer ring 202.

In the thus constructed rpm detection mechanism, when the rotor shaft R rotates, the target 203 mounted on the retainer ring 202 rotates across and above the rpm detecting coil 201. Thus, as shown in FIG. 7(b), an induction voltage is outputted in response to the rpm of the rotor shaft R from the rpm detecting coil 201. The rpm of the DC brushless motor is detected from the induction voltage.

Since the conventional device provided with the DC brushless motor and the rpm detection mechanism such as a magnetic bearing device or a turbomolecular pump device requires elongate components for the rpm detection mechanism, the cost for the components increases and the rpm detection mechanism becomes complicated. Therefore, the assembling and adjusting operations are time-consuming.

Also, since the number of the components for the rpm detection mechanism is large, the dimension of the overall device is large and the device is heavy in weight.

In particular in the rotor that rotates at a high speed as in the turbomolecular pump device, since the number of the components is large, its rotary shaft is long and heavy in weight so that the natural bending frequency of the shaft is low. In this case, even if the rpm of the rotor is increased in order to enhance the vacuum performance, when the rpm would be close to the natural frequency of the shaft, the shaft could not rotate due to the resonance. Thus, there is a problem that the rpm could not be increased as desired.

SUMMARY OF THE INVENTION

Accordingly, in order to overcome the foregoing defects inherent in the conventional technology, a primary object of the present invention is to provide a DC brushless motor provided with an rpm detection mechanism with a simple structure.

A secondary object of the present invention is to provide a magnetic bearing device having the DC brushless motor with such a simple structure.

A tertiary object of the present invention is to provide a turbomolecular pump device having such a magnetic bearing device.

In order to attain the primary object, according to a first aspect of the present invention, there is provided a DC brushless motor in which a rotor with a permanent magnet thereon and a stator coil for generating a magnetic field for rotating the rotor are disposed to face the permanent magnet at a predetermined interval, characterized in that a sensor for outputting an output in response to a change of a polarity of the magnetic pole by the permanent magnet is disposed at least under a non-contact condition with the permanent magnet in the space defined by the stator and the rotor.

Then, for instance, a pickup coil or a Hall sensor may be used as the sensor for detecting the change in polarity.

Since the sensor for detecting the change in polarity by the permanent magnet is thus disposed in the space defined by the stator and the rotor, it is possible to provide the rpm detection mechanism with a simple structure and to make the system small in size and light in weight.

Also, in order to attain the secondary object of the present invention, in accordance with a second aspect of the invention, there is provided a magnetic bearing device comprising the above-described DC brushless motor, a drive control means for controlling rotation of the DC brushless motor, and a magnetic bearing for magnetically supporting a rotary shaft of a rotor of the DC brushless motor by an electromagnet and for controlling a magnetic force of the electromagnet so that the rotary shaft takes a target position.

Then, according to a third aspect of the invention, the magnetic bearing device further comprises an rpm decision means for deciding an rpm of the rotor from the output of the sensor of the DC brushless motor, and the drive control means stops the rotation of the DC brushless motor in the case where the rpm decision means decides that the rpm of the rotor exceeds a predetermined value. Thus, since the rotation of the DC brushless motor is stopped, it is possible to prevent the overspeed of the DC brushless motor.

Also, according to a fourth aspect of the invention, the magnetic bearing device further comprises an rpm decision means for deciding an rpm of the rotor from the output of the sensor of the DC brushless motor, and a power supply stopping means for stopping a supply of the power to the DC brushless motor in the case where the rpm decision means decides that the rpm of the rotor exceeds a predetermined value. Thus, since the supply of the power for driving the DC brushless motor is forcibly stopped, it is possible to stop the rotation of the DC brushless motor without fail.

In accordance with a fifth aspect of the invention, the magnetic bearing device comprises a further power supply stopping means for stopping a supply of the power to the DC brushless motor in the case where the rpm decision means decides that the rpm of the rotor exceeds a predetermined value for a predetermined period. It is possible to continue the rotation without forcibly stopping the DC brushless motor in the case where the overspeed may be improved in a predetermined period of time by stopping the feed after the predetermined period without immediately stopping the supply of the power in the case the rpm exceeds the predetermined value.

In the magnetic bearing device according to a sixth aspect, the rpm decision means decides the rpm of the rotor on the basis of a signal after the output of the pickup coil has passed through at least one of an integrator and the primary or secondary or more low pass filter of a pass band having a higher frequency than a rated rpm of the DC brushless motor. Thus, the output of the pickup coil has passed through the low pass filter and/or integrator so that the noise voltage induced in the pickup coil by the rotational control by the drive means or the rotation of the permanent magnet may be effectively removed. Accordingly, it is possible to make an exact decision of the rpm of the rotor.

Also, in order to attain the third object of the present invention, in accordance with a seventh aspect of the present invention, the turbomolecular pump device is provided with the magnetic bearing device, stator blades disposed in a plurality of stages in an axial direction, and a plurality of stages of rotor blades disposed in the rotor and rotating between the stator blades.

Thus, in the turbomolecular pump device, since the DC brushless motor provided with the rpm detection mechanism with a simple structure is used, it is possible to prevent the device from being heavy in weight and the rotary shaft from being elongated. As a result, the natural frequency thereof may be prevented from being low, and high speed rotation is possible.

DETAILED DESCRIPTION OF THE PREFERRED EMBODIMENTS

An embodiment of the present invention will now be described in detail with reference to FIGS. 1 to 5.

(1) Scheme of Embodiment

Figure 1:
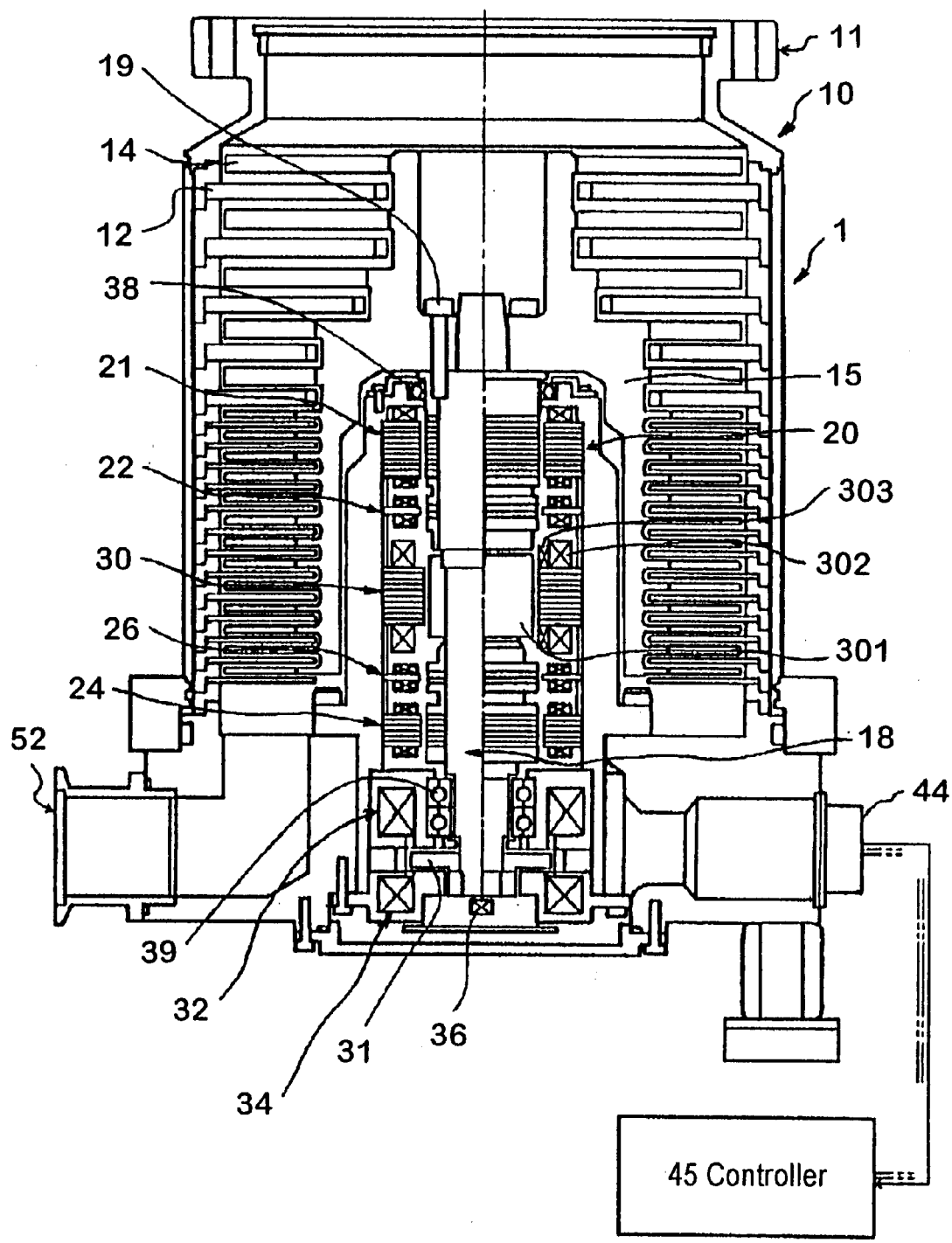
FIG. 1 is a cross-sectional view of an overall structure of a turbomolecular pump device in accordance with one embodiment of the present invention.

As shown in FIG. 1, a pickup coil 303 for detecting a magnetic flux produced by a permanent magnet 301 of a DC brushless motor 30 is built in the motor. Namely, the pickup coil 303 which is small in size, low in cost, simple in structure and strong in durability is interposed between the permanent magnet (rotor) 301 of the DC brushless motor 30 and the a motor drive coil (stator coil) 302.

Figure 2:
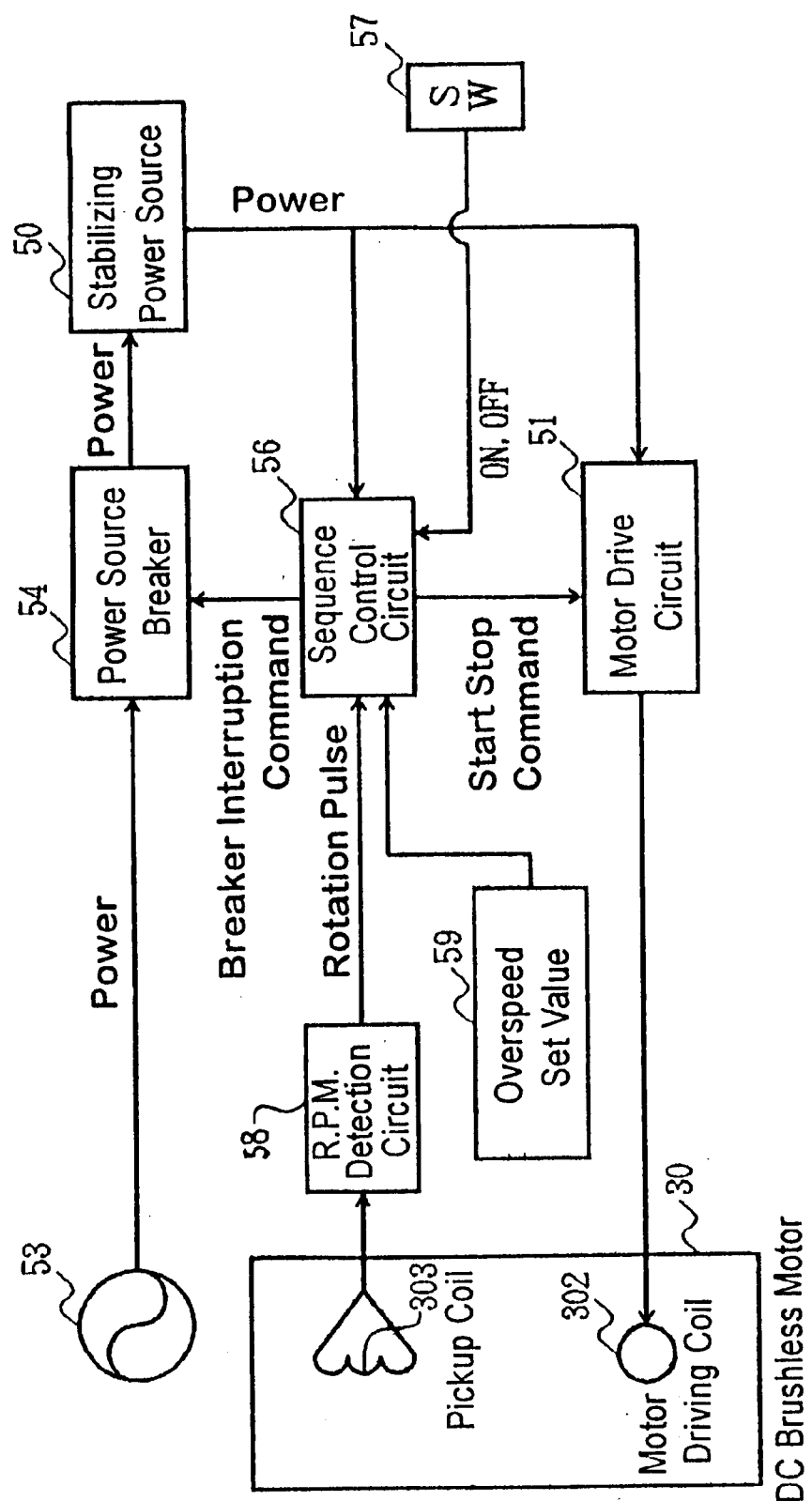
FIG. 2 is a block diagram showing a circuit structure of a motor drive system in a control system for the turbomolecular pump device shown in FIG. 1.

Then, as shown in FIG. 2, a change of the flux produced by the permanent magnet 301 which is rotating is detected by the pickup coil 303 and an rpm detection circuit 58, is converted into an rpm signal of the DC brushless motor 30 by a sequence controlling circuit 56, and is supervised whether the operational condition is under the overspeed condition or not. Then, when the overspeed is detected, an interruption command is fed to a power source breaker 54 to thereby forcibly interrupt the supply of the electric power to thereby forcibly stop the DC brushless motor 30.

(2) Details of Embodiment

The turbomolecular pump device provided with the inner rotor type permanent-magnet rotary type DC brushless motor 30 in accordance with the embodiment will now be described in detail.

FIG. 1 shows an overall cross-section of the turbomolecular pump device.

This turbomolecular pump device 1 is disposed in, for example, a semiconductor production line for discharging a process gas from a chamber or the like. In this example, a flange 11 is formed at an upper end portion of an outer casing 10 formed into a cylinder and is connected to the semiconductor production line or the like by bolts or the like.

As shown in FIG. 1, the turbomolecular pump device 1 is provided with a substantially cylindrical rotor shaft 18, a plurality of stages of rotor blades 14 mounted on the rotor shaft 18 by bolts 19, the substantially cylindrical outer casing 10, a plurality of stages of stator blades 12 fixed to the inner periphery of the outer casing 10, a magnetic bearing 20 for magnetically carrying the rotor shaft 18, and the DC brushless motor 30 for generating a torque to the rotor shaft 18.

Each stage of the plurality of stator blades 12 is assembled and disposed inside the outer casing 10.

The plurality of rotor blades 14 are interposed between respective stator blades 12. Each rotor blade 14 is formed integrally with outer circumferential wall of a rotor 15. The rotor 15 is fixed to the rotor shaft 18 by the bolts 19 so as to rotate together with the rotor shaft 18.

Each rotor blade 14 has a plurality of blade elements whose outer sides are opened. Also, each stator blade 12 has a plurality of blade elements (any type may be used out of a type in which the central axial sides are connected to each other and a type in which the central axial sides are opened).

In this embodiment, the rotor blades 14 and the stator blades 12 constitute an exhaust stage, an intermediate stage and a compression stage from the upstream side. The rotor blades 14 and the stator blades 12 which form the compression stage (lower side in the drawing) are provided in a higher density (under the condition that the interval between the adjacent rotor blade 14 and stator blade 12 is narrower) than that of the blades in the other stages in order to prevent the counterflow of the gas from an outlet port 52. Incidentally, it should be noted that the application of the present invention is not limited to the three-stage structure of the exhaust, intermediate and compression stages. It is possible to modify the structure to a two-stage structure of the exhaust stage and the compression stage, or a two-stage structure in which each stage shares the function to the other stage, or a structure in which there is no clear cut between the adjacent stages.

The magnetic bearing 20 is provided with radial electromagnets 21 and 24 for generating a magnetic force in the radial direction to the rotor shaft 18, radial sensors 22 and 26 for detecting the radial position of the rotor shaft 18, axial electromagnets 32 and 34 for generating an axial magnetic force to the rotor shaft 18, a metal disc 31 to which the axial force produced by the axial electromagnets 32 and 34 is applied, and an axial sensor 36 for detecting the position in an axial direction of the rotor shaft 18.

The radial electromagnet 21 is composed of two pairs of electromagnets which intersect perpendicular to each other. Each pair of electromagnets are disposed to face each other to interpose the rotor shaft 18 therebetween above the DC brushless motor 30 of the rotor shaft 18.

Two pairs of radial sensors 22 which are close to the radial electromagnet 21 to face each other to interpose the rotor shaft 18 therebetween are provided between the radial electromagnet 21 and the DC brushless motor 30. The two pairs of radial sensors 22 are arranged to intersect perpendicular to each other in correspondence with the two pairs of radial electromagnets 21.

Furthermore, in the same manner, two pairs of radial electromagnets 24 are arranged to intersect perpendicular to each other below the DC brushless motor 30 of the rotor shaft 18.

Also, in the same manner, two pairs of radial sensors 26 are provided in the vicinity of the radial electromagnets 24 between the radial electromagnets 24 and the DC brushless motor 30.

An exciting current is fed to the radial electromagnets 21 and 24 to thereby magnetically float the rotor shaft 18. The exciting current is controlled in response to a position detection signal from the radial sensors 22 and 26 in the magnetically floating state. Thus, the rotor shaft 18 is maintained in a predetermined position in the radial direction.

The metal disc 31 made of magnetic member is fixed to a lower portion of the rotor shaft 18. Each pair of axial electromagnets 32 and 34 are disposed to interpose the metal disc 31 therebetween and to face each other. Furthermore, an axial sensor 36 is disposed to face the lower end portion of the rotor shaft 18.

The exciting current of the axial electromagnets 32 and 34 is controlled in response to the position detection signal from the axial sensor 36. Thus, the rotor shaft 18 may be maintained in a predetermined position in the axial direction.

The magnetic bearing 20 is provided in a control system 45 with a magnetic bearing controlling section for performing a feedback control of the exciting currents of the radial electromagnets 21 and 24, the axial electromagnets 32 and 34 and the like on the basis of the detection signals of the radial sensors 22 and 26 and the axial sensor 36 to thereby magnetically float the rotor shaft 18.

Touch down bearings 38 and 39 are disposed on the upper and lower portions of the rotor shaft 18.

In general, the rotor portion composed of the rotor shaft 18 and the respective parts mounted thereon is pivoted out of contact by the magnetic bearing 20 during the rotation by the DC brushless motor 30. The touch down bearings 38 and 39 serve as bearings for protecting the overall system by supporting the rotor portion instead of the magnetic bearing 20 in case of the generation of the touch down.

Accordingly, the touch down bearings 38 and 39 are disposed with their inner races out of contact with the rotor shaft 18.

The DC brushless motor 30 is disposed substantially at the central position in the axial direction of the rotor shaft 18 between the radial sensor 22 and the radial sensor 26 inside of the outer casing 10. The current is supplied to the DC brushless motor 30 so that the rotor shaft 18, the rotor 15 and the rotor blades 14 fixed thereto may be rotated.

As shown in FIG. 1, the DC brushless motor 30 is an inner rotor type permanent-magnet rotary type motor. A permanent magnet 301 is mounted on the rotor shaft 18. In the DC brushless motor 30, a motor drive coil (stator coil) 302 is disposed to face the permanent magnet 301 at a predetermined interval.

An rpm pickup coil (sensor) 303 is disposed in a non-contact condition with the permanent magnet 301 between the motor drive coil 302 and the permanent magnet 301. The rpm pickup coil 303 detects a magnetic flux generated by the permanent magnet 301 rotating together with the rotor shaft 18 and converts it into an rpm signal in the control system 45.

Thus, the pickup coil 303 is interposed between the motor drive coil 302 and the permanent magnet 301 so that the rpm may be detected under the condition that the same dimension as that of the conventional DC brushless motor is maintained.

The outlet port 52 for discharging the process gas or the like from the semiconductor production line is disposed in the lower portion of the outer casing 10 of the turbomolecular pump device Also, the turbomolecular pump device is connected to the control system 45 through a connector 44 and a cable.

FIG. 2 is a block diagram showing a circuit structure of a motor drive system 46 in the control system 45.

As shown in FIG. 2, the motor drive system 46 has a motor drive circuit 51 for PWM controlling the drive of the DC brushless motor 30 to serve as a drive controlling means, a stabilizing power source 50 for stabilizing the voltage of the power fed from the power source 53 and feeding it to the motor drive circuit 51, and a power source breaker 54 for interrupting the power fed from the power source 53 to the stabilizing power source 50 to serve as a power supply stopping means.

Also, the motor drive system 46 is provided with a sequence controlling circuit 56 serving as an rpm decision means, a switch (SW) 57 for the operator to instruct the drive and stop of the DC brushless motor 30, an rpm detection circuit 58 and an overspeed set value 59.

Incidentally, the power fed from the power source 53 may be fed through another system to the magnetic bearing control system (not shown) for controlling the magnetic bearing 20 in addition to the motor drive system 46 shown in FIG. 2. Accordingly, as described later in this embodiment, even if the power source breaker 54 is interrupted by the detection of the overspeed, the bearing operation of the rotor shaft 18 by the magnetic bearing 20 is continued without any adverse affect to the magnetic bearing control system.

The output voltage of the pickup coil 303 disposed in the DC brushless motor 30 is fed into the rpm detection circuit 58 which generates one pulse per one rotation of the rotor 15 on the basis of the input voltage to feed it to the sequence controlling circuit 56.

In the overspeed set value 59, a value of the overspeed is set as a threshold value (predetermined value) concerning the rpm of the DC brushless motor 30. The set value is fed to the sequence controlling circuit 56.

The sequence controlling circuit 56 supervises, from the rotation pulse fed from the rpm detection circuit 58, whether or not the DC brushless motor 30 exceeds the threshold value fed from the overspeed set value. The sequence controlling circuit 56 feeds a start stop command signal to the motor drive circuit 51 and simultaneously feeds a breaker interruption command signal to the power source breaker 54 in case of the overspeed. The sequence controlling circuit 56 feeds a variety of control signals such as a start signal or a speed command signal to the motor drive circuit 51. The start signal is fed to the motor drive circuit 51 by inputting the ON signal from the switch 57.

Figure 3:
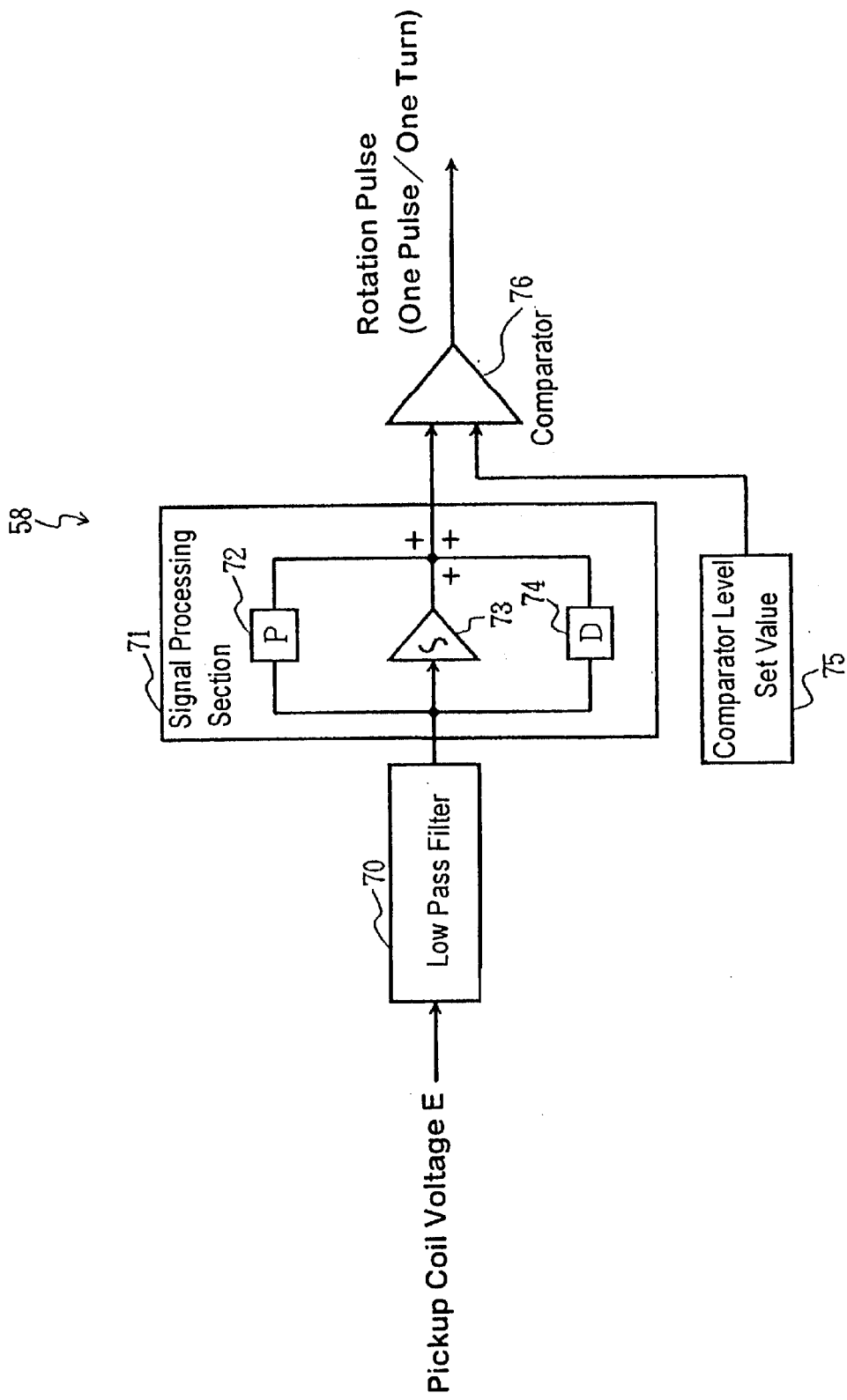
FIG. 3 is a block diagram showing a circuit structure of the rpm detection circuit in a motor drive system for the turbomolecular pump device shown in FIG. 1.

FIG. 3 is a circuit diagram showing the rpm detection circuit 58.

As shown in FIG. 3, the rpm detection circuit 58 is provided with a low pass filter 70 into which a voltage E detected by the pickup coil 303 is inputted, a signal processing section 71, a comparator level set value 75 and a comparator 76.

The low pass filter 70 is a filter for removing a noise inputted together with the voltage E of the pickup coil. The low pass filter is a primary or secondary or more low pass filter with a pass band having a higher frequency than the rpm of the DC brushless motor 30.

The signal processing section 71 is provided with a proportional circuit 72, an integrating circuit 73 and a differential circuit 74 so that the voltage E from which the noise has been removed is inputted from the low pass filter 70.

Figure 4:
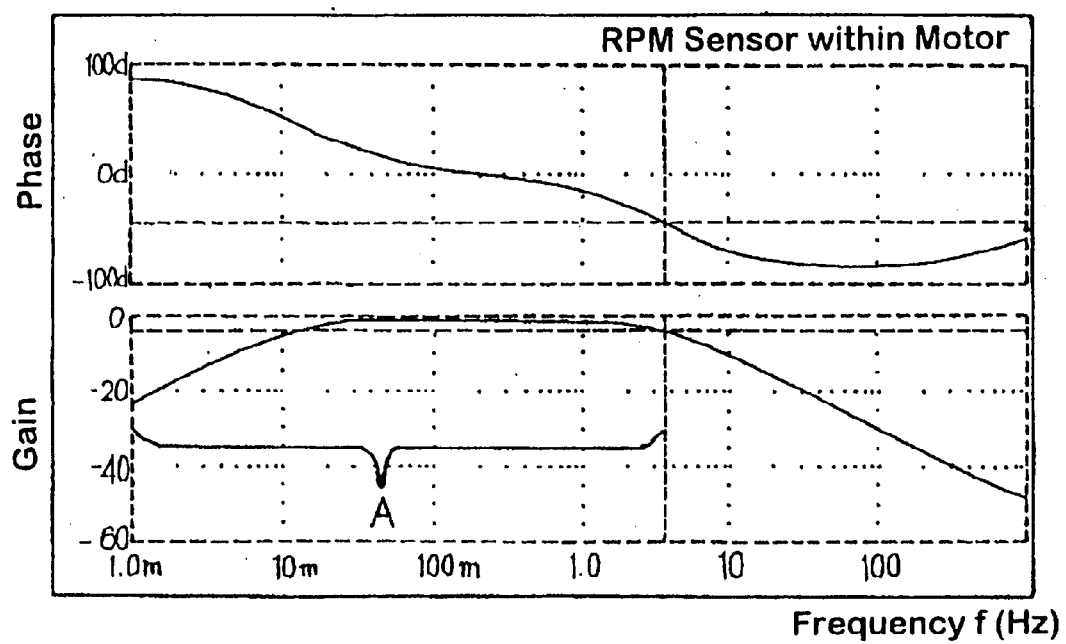
FIG. 4 is a graph showing a frequency characteristic in a signal processing section of the rpm detection circuit for the turbomolecular pump device shown in FIG. 1.

FIG. 4 shows a frequency characteristic in the signal processing section 71.

The counter-electromotive force of the DC brushless motor 30 is increased in proportion to the rpm. Accordingly, an rpm detecting operation that is very tough against the noise may be performed by inputting the voltage E of the pickup coil 303 through the integrator to the comparator circuit.

Also, the proportional circuit 72 and the differential circuit 74 are used, and as indicated by character A in FIG. 4, the gain is decreased in the condition that the frequency is low (i.e., in the condition that the rpm of the DC brushless motor 30 is low) so that the malfunction may be prevented in case of the low frequency such as in the start and stop operations.

The comparator 76 compares the signal, from which the noise has been removed in the signal processing section 71, with the set value fed from the comparator level set value 75 so that the polarity of the voltage E is detected and the pulse signal of one pulse/one turn is generated.

Figure 5:
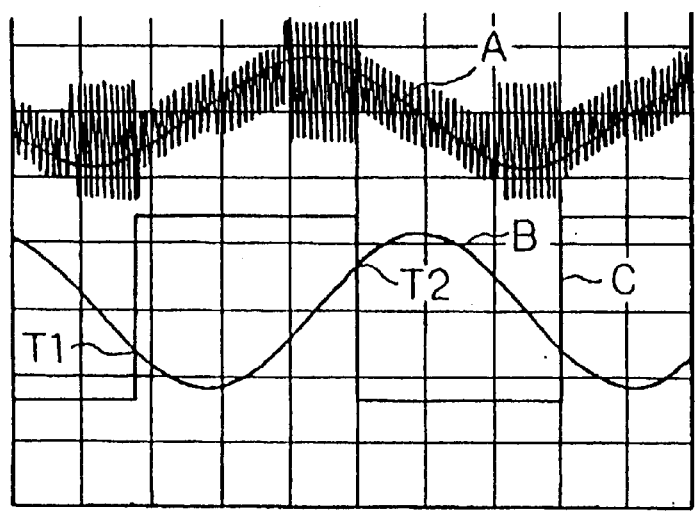
FIG. 5 is a graph showing a state of a signal of each section of the rpm detection circuit for the turbomolecular pump device shown in FIG. 1.
Figure 6:
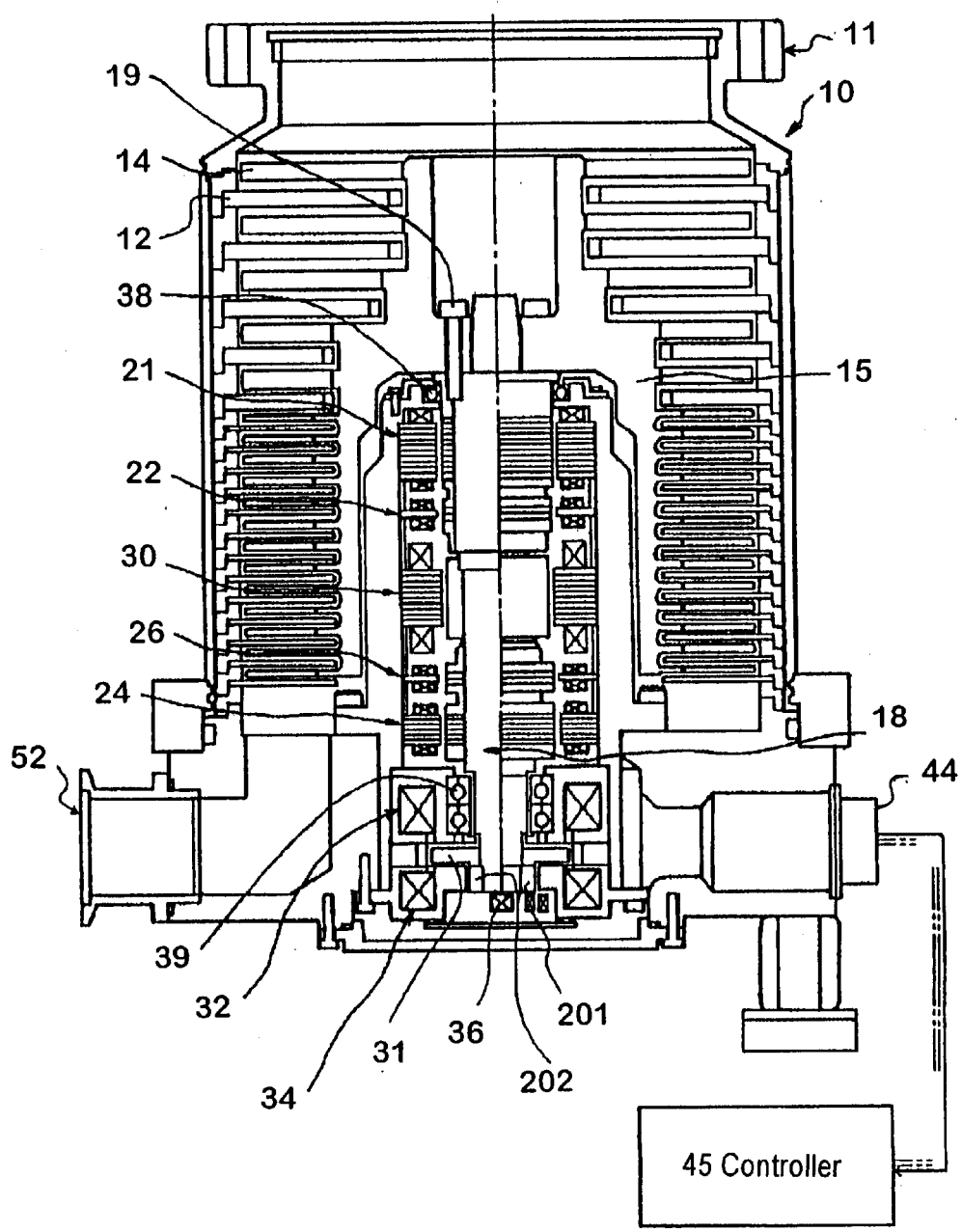
FIG. 6 is a cross-sectional view showing an overview of a conventional turbomolecular pump device.
Figure 7A:
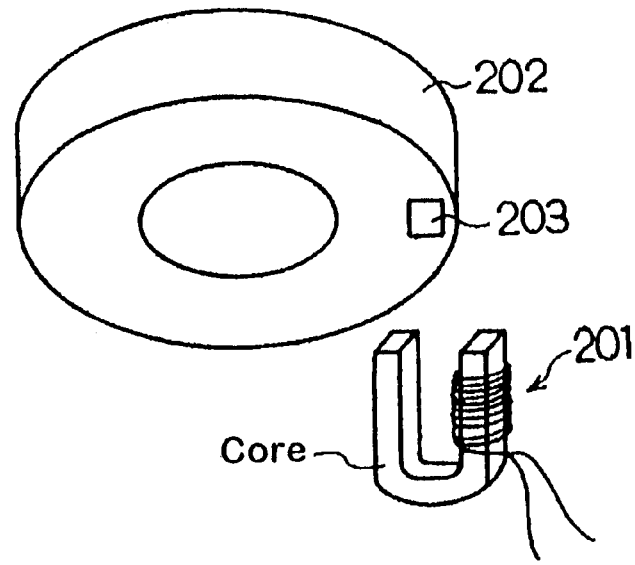
FIG. 7 is a schematic illustration of the conventional turbomolecular pump device with part (a) showing a structure of an rpm detection mechanism and part (b) showing a detection signal.
Figure 7B:
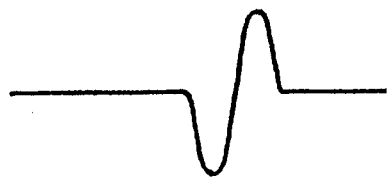

FIG. 5 shows a state of the signal in each portion of the rpm detection circuit 58.

In FIG. 5, character A represents the pickup coil voltage E. The voltage E is fed into the rpm detection circuit 58 under the condition that a large amount of noise caused by PWM driving the DC brushless motor 30 is introduced.

Character B represents the output of the signal processing section 71. After the noise has been removed by the low pass filter 70 and the signal processing section 71, the output is fed into the comparator 76.

Character C represents an output signal of the comparator 76. The pulse signal of one pulse/one turn is generated from the signal after the noise removal in the comparator 76. The output signal is fed into the sequence signal circuit 56 as the output from the rpm detection circuit 58.

The operation of the control system 45 of the thus constructed turbomolecular pump device will now be described.

First of all, when the switch 57 is operated by the operator to input the ON signal into the sequence controlling circuit 56, the start signal is fed from the sequence controlling circuit 56 into the motor drive circuit 51. Thus, the motor drive circuit 51 controls the power to be fed from the power source 53 through the power source breaker 54 and the stabilizing power source 50 to thereby PWM drive the DC brushless motor 30. Then, the DC brushless motor 30 starts the rotation.

When the DC brushless motor 30 is rotated, the permanent magnet 301 mounted on the rotor shaft 18 traverses the pickup coil 303 so that the counter-electromotive force is induced in the pickup coil 303. Additionally, although the voltage level is low, the output voltage of the motor drive circuit is also induced as a noise voltage.

The voltage E (the sum of the counter-electromotive force and the noise voltage by the permanent magnet 301) in synchronism with the rpm is outputted from the pickup coil 303 to be fed into the rpm detection circuit 58.

In the rpm detection circuit 58, after the noise voltage has been removed in the low pass filter 70 and the signal processing section 71, the polarity of the voltage is detected in the comparator 76 to generate the pulse signal of one pulse/one turn to be fed to the sequence controlling circuit 56.

The sequence controlling circuit 56 monitors the rpm of the DC brushless motor from the fed pulse signal, compares it with the predetermined rated rpm fed from the overspeed set value 59 and supervises whether it is the overspeed or not.

Then, when the sequence controlling circuit 56 detects the overspeed, the sequence controlling circuit 56 feeds the motor drive stop command to the motor drive circuit 51 to stop the DC brushless motor 30.

Also, since the overspeed is generated in general in the case where the motor drive circuit 51 is broken down, not only the stop command is provided to the motor drive circuit 51 but also the interruption signal is fed to the power source breaker 54. When this interruption signal is fed, the power source breaker 54 forcibly interrupts the supply of the power from the power source 53 to the stabilizing power source 50. Thus, even if the control system by the motor drive circuit 51 is broken down, the supply of the drive power is forcibly interrupted so that the DC brushless motor 30 may be stopped in safety.

As described above, in the system in accordance with the embodiment (DC brushless motor, magnetic bearing device and turbomolecular pump device), since the mechanism for detecting the rpm of the DC brushless motor 30 is small in size, simple and high in strength, it is possible to reduce the cost therefor.

Also, it is possible to make the system small in size and light in weight.

Furthermore, by using the DC brushless motor in accordance with the embodiment, it is possible to readily detect the overspeed. Thus, the high reliability is ensured. Also, since it is possible to stop the motor by forcibly interrupting the power source in the case where the overspeed is detected in the magnetic bearing device and the turbomolecular pump device in accordance with the embodiment, it is possible to ensure the high reliability.

Also, in the DC brushless motor and the magnetic bearing device in accordance with the embodiment, since the detection of the overspeed is facilitated, it is possible to rotate the rotor at a high speed. Also, in the turbomolecular pump device, since the rotor may be rotated at a high speed, it is possible to enhance the vacuum property of the pump.

Although the present invention has been described in conjunction with one embodiment thereof, it is understood that the present invention is not limited to one embodiment but may be applied in various modifications within the scope of the appended claims.

For example, in the described embodiment, the present invention has been applied to the turbomolecular pump device provided with the inner rotor type permanent magnetic rotary type DC brushless motor 30. However, it is possible to apply the present invention to an outer rotor type DC brushless motor.

Also, in the described embodiment, in the case where the overspeed is detected, the sequence controlling circuit 56 feeds the start stop command to the motor drive circuit 51 and at the same time feeds the interruption signal to the power source breaker 54. However, first of all, the start stop command may be fed to the motor drive circuit 51, and in the case where the overspeed condition is continued in a predetermined time period thereafter, it is possible to feed the interruption signal to the power source breaker 54. This is because there are cases where the motor drive circuit 51 is normally operated by the start stop command to the motor drive circuit 51 to stop the DC brushless motor 30.

Also, in case of the detection of the overspeed, the sequence controlling circuit 56 may forcibly stop the DC brushless motor 30 by immediately feeding the interruption signal to the power source breaker 54 without feeding the start stop command to the motor drive circuit 51.

Furthermore, in the rpm detection circuit 58 in accordance with the above-described embodiment, since it is possible to remove the noise voltage also in the integrating circuit 73, the pickup coil voltage E may be inputted directly into the signal processing section 71 without providing the low pass filter 70.

Also, the case where the proportional circuit 72, the integrating circuit 73 and the deferential circuit 74 which constitute the signal processing section 71 are connected in parallel with each other is described as an example. However, these three components may be connected in series with each other or connected in series-parallel.

In the foregoing embodiment, the pickup coil 303 is used as the sensor for detecting the change in polarity of magnet caused by the rotation of the permanent magnet 301. However, according to the present invention, another Hall sensor may be used and may be interposed between the motor drive coil 302 and the permanent magnet 301.

Also, in the above-described embodiment, it is prerequisite that two poles are used as the polarity numbers for the rotor of the DC brushless motor 30, and a signal of one pulse/one turn is outputted from the rpm detection circuit 58. According to the present invention, a DC brushless motor of N poles (N is an even number) may be used. In this case, the signal of N/2 pulse per one turn is outputted from the rpm detection circuit, and one turn is recognized in the sequence controlling circuit 56 for every N/2 pulses.

As described above, in a DC brushless motor according to a first aspect of the present invention, since the sensor for outputting the output in response to the change of the polarity by the permanent magnet is disposed at least in the non-contact condition with the permanent magnet in the space defined by the stator and the rotor, it is possible to provide the rpm detection mechanism with a simple structure.

In the magnetic bearing device in accordance with a second aspect of the present invention, it is possible to simplify it with the DC brushless motor with such a simple structure.

In the magnetic bearing device in accordance with third to fifth aspects of the present invention, it is possible to readily stop the rotation of the DC brushless motor in the case where the rpm of the rotor exceeds the predetermined value.

In the magnetic bearing device in accordance with a sixth aspect of the invention, since the rpm of the above-described rotor is decided on the basis of the signal after the output of the pickup coil is passed through at least one of the integrator and the primary or secondary or more low pass filter of the pass band having a higher frequency than the rated rpm of the DC brushless motor, it is possible to effectively remove the noise voltage induced in the pickup coil. Accordingly, it is possible to make a more exact decision as to the rpm of the rotor.

In the turbomolecular pump device in accordance with a seventh aspect of the invention, it is possible to detect the rpm of the rotor with a simple structure. Also, in the case where the detected rpm exceeds the predetermined value, it is possible to easily stop the rotation of the DC brushless motor. Also, since the rpm detection mechanism is simple, the rotor shaft is not elongated or made heavier so that the natural bending frequency of the shaft is prevented from decreasing. As a result, it is possible to enhance the vacuum property with a high rpm.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A magnetic bearing device comprising: a DC brushless motor comprised of a rotor having a permanent magnet and a rotary shaft, a stator coil for generating a magnetic field to rotate the rotor and disposed opposite to and spaced-apart from the permanent magnet, and a sensor for detecting a change in a polarity of the permanent magnet, the sensor being disposed between the rotor and the stator coil and in a non-contact state with the permanent magnet; drive control means for controlling the rotation of the rotor of the DC brushless motor; and a magnetic bearing having an electromagnet for magnetically supporting the rotary shaft of the DC brushless motor and for controlling a magnetic force of the electromagnet to support the rotary shaft at a preselected position.

2. A magnetic bearing device according to claim 1; further comprising determining means for determining an rpm of the rotor of the DC brushless motor in accordance with an output from the sensor; and wherein the drive control means includes means for stopping rotation of the rotor when the rpm of the rotor determined by the determining means exceeds a predetermined value.

3. A magnetic bearing device according to claim 2; wherein the sensor comprises a pickup coil.

4. A magnetic bearing device according to claim 1; further comprising determining means for determining an rpm of the rotor of the DC brushless motor in accordance with an output from the sensor, and power supply stopping means for stopping a supply of power to the DC brushless motor to stop rotation of the rotor when the rpm of the rotor determined by the determining means exceeds a preselected value.

5. A magnetic bearing device according to claim 4; wherein the sensor comprises a pickup coil.

6. A magnetic bearing device according to claim 4; wherein the power supply stopping means includes means for stopping supply of the power to the DC brushless motor when the rpm of the rotor determined by the determining means exceeds a preselected value for a preselected period of time.

7. A magnetic bearing device according to claim 4; wherein the sensor comprises a pickup coil.

8. A turbomolecular pump device comprising: a DC brushless motor comprised of a rotor having a permanent magnet and a rotary shaft extending in an axial direction, a stator coil for generating a magnetic field to rotate the rotor and disposed opposite to and spaced-apart from the permanent magnet, and a sensor for detecting a change in a polarity of the permanent magnet, the sensor being disposed between the rotor and the stator coil and in a non-contact state with the permanent magnet; stator blades disposed in a plurality of stages in the axial direction; a plurality of stages of rotor blades disposed on the rotor of the DC brushless motor for undergoing rotation between the stator blades; drive control means for controlling the rotation of the rotor of the DC brushless motor; and a magnetic bearing having an electromagnet for magnetically supporting the rotary shaft of the DC brushless motor and for controlling a magnetic force of the electromagnet to support the rotary shaft at a preselected position.

9. A turbomolecular pump device according to claim 8; further comprising determining means for determining an rpm of the rotor of the DC brushless motor in accordance with an output from the sensor; and wherein the drive control means includes means for stopping rotation of the rotor when the rpm of the rotor determined by the determining means exceeds a predetermined value.

10. A turbomolecular pump device according to claim 9; wherein the sensor comprises a pickup coil.

11. A turbomolecular pump device according to claim 8; further comprising determining means for determining an rpm of the rotor of the DC brushless motor in accordance with an output from the sensor, and power supply stopping means for stopping a supply of power to the DC brushless motor to stop rotation of the rotor when the rpm of the rotor determined by the determining means exceeds a preselected value.

12. A turbomolecular pump device according to claim 11; wherein the sensor comprises a pickup coil.

13. A turbomolecular pump device according to claim 11; wherein the power supply stopping means includes means for stopping supply of the power to the DC brushless motor when the rpm of the rotor determined by the determining means exceeds a preselected value for a preselected period of time.

14. A turbomolecular pump device according to claim 13; wherein the sensor comprises a pickup coil.

\* \* \* \* \*